UNITED STATES PATENT OFFICE 2,514,347

ISOMERIZATION OF SECONDARY ARALKYL PHENOLS

Ralph I. Dunlap, Jr., Springfield, Mass., assignor to Monsanto Chemical Company, St. Louis, Mo., a corporation of Delaware No Drawing. Application December 5, 1946, Serial No. 714,138

8 Claims. (Cl. 260—619)

This invention relates to a process for the isomerization of secondary aralkyl phenols. More particularly the invention is related to a process for the isomerization of ortho isomers of secondary aralkyl phenols to the corresponding para isomers.

It is an object of this invention to provide a process for isomerizing secondary aralkyl phenols.

A further object is to provide a process for converting ortho secondary aralkyl phenols to para secondary aralkyl phenols.

These and other objects are attained by heating ortho secondary aralkyl phenols in the presence of phenol and aluminum chloride, anhydrous hydrogen fluoride, or boron trifluoride.

The following examples are given in illustration and are not intended to limit the scope of this invention. Where parts are mentioned, they are parts by weight.

Example I 198 parts of 2-hydroxyphenyl-phenyl-methyl-methane were dissolved in 800 parts of phenol containing 12½ parts of anhydrous hydrogen fluoride. The solution was heated at about 50° C. for about 65 hours under constant agitation. The resulting solution was then refluxed to remove the major portion of the hydrogen fluoride. The remaining traces of hydrogen fluoride were neutralized with 20% aqueous sodium carbonate and the mixture was distilled under a reduced pressure of about 100 mm. of mercury (absolute) to remove water and phenol. The product was a viscous, oily mixture containing a 60-40 mixture of 4-hydroxyphenyl-phenyl-methyl-methane and 2-hydroxyphenyl-phenyl-methyl-methane and a small amount of high-boiling oils. The mixture was then subjected to fractional distillation at 1 to 10 mm. of mercury (absolute) to obtain the isomeric products in separate fractions. The 2-hydroxy-phenyl-phenyl-methyl-methane could again be subjected to the isomerization treatment.

Example II 159 parts of 2-hydroxyphenyl-phenyl-methyl-methane were dissolved in 670 parts of phenol containing 2.5 parts of boron trifluoride. The solution was heated at from 95–110° C. for about 10 hours under constant agitation and then allowed to stand at room temperature for about 48 hours. To the resultant solution, 1 part of sodium carbonate (in 20% aqueous solution) was added and the solution was distilled under reduced pressure of about 100 mm. mercury (absolute). The vacuum was then increased to about 1–10 mm. of mercury pressure (absolute) to separate the isomeric materials, one from the other, and also from the high-boiling residue.

Example III 122 parts of 2-hydroxyphenyl-phenyl-methyl-methane were dissolved in 232 parts of phenol containing 9 parts of anhydrous aluminum chloride. The solution was stirred at 45–55° C. for 7 hours, allowed to stand over night at room temperature and then reheated to 50° C. 20% aqueous sodium carbonate was then added to precipitate the catalyst and the precipitated salts were removed by filtration. Water and phenol were removed by distillation under reduced pressure to obtain a 78% yield of a 60-40 mixture of 4-hydroxyphenyl-phenyl-methyl-methane and 2-hydroxyphenyl-phenyl-methyl-methane. The isomers were separated by fractional distillation at about 1 to about 10 mm. of mercury pressure (absolute).

The isomerization process is sensitive to temperature, time of reaction, and the amount and type of catalyst. The amount of catalyst may be varied from about 0.5 to about 10 parts per 100 parts of aralkyl phenol. The amount of catalyst used for optimum results will vary with the temperatures; i. e., at 50° C. from about 2% to about 10% of catalyst must be used but at 100–120° C. the amount of catalyst used may be reduced to as little as 0.5% and still obtain efficient isomerization. The temperature of the isomerization reaction may be varied from about 25° C. to about 150° C., a faster reaction using less catalyst being obtained at the higher temperatures. However, volatility of hydrogen fluoride restricts the temperature range with this catalyst unless additional catalyst is added during the reaction.

The catalysts which comprise aluminum chloride, hydrogen fluoride, and boron trifluoride may be removed from the reaction product by any of the conventional means such as neutralization, decomposition or distillation. Hydrogen fluoride and boron trifluoride are particularly advantageous since they may be recovered by distillation and absorption in phenol. A mixture of catalysts may be used.

The phenol shown as a solvent for 2-hydroxyphenyl-phenyl-methyl-methane not only acts as a solvent but also appears to have some direct influence on the reaction. As a result, it is an essential part of the process of this invention.

The isomerization process of this invention is applicable generally to secondary aralkyl phenols. In place of the 2-hydroxyphenyl-phenyl-methyl-methane shown in the examples, other secondary aralkyl phenols may be used such as those derived from phenol and a substituted styrene, including α-methyl styrene, α-ethyl styrene, p-methyl-α-methyl styrene, p-ethyl-α-methyl styrene, etc.

The process of this invention is particularly advantageous in the preparation of secondary aralkyl phenols having the hydroxyl group in the para position which phenols are reactive with aldehydes to provide resinous materials. It provides a method for transforming secondary ortho aralkyl phenols to secondary para aralkyl phenols which is especially valuable since the ortho isomers, when reacted with aldehydes, give resins of poor color and ageing characteristics.

It is obvious that many variations of the products and processes may be made without departing from the spirit and scope of this invention as defined in the appended claims.

What is claimed is:

1. A process for the isomerization of 2-hydroxy-phenyl-phenyl-methyl-methane to 4-hydroxyphenyl-phenyl-methyl-methane which comprises heating at 45° C. to 120° C. for 7 to 65 hours 100 parts of the 2-hydroxyphenyl-phenyl-methyl-methane in contact with phenol and from 0.5 to 10 parts of a catalyst taken from the group consisting of aluminum choride, hydrogen fluoride, and boron tri-fluoride.

2. A process for the isomerization of 2-hydroxy-phenyl-phenyl-methyl-methane to 4-hydroxyphenyl-phenyl-methyl-methane which comprises heating at 45° C. to 120° C. for 7 to 65 hours 100 parts of the 2-hydroxyphenyl-phenyl-methyl-methane in contact with phenol and from 0.5 to 10 parts of an aluminum chloride catalyst.

3. A process for the isomerization of 2-hydroxy-phenyl-phenyl-methyl-methane to 4-hydroxyphenyl-phenyl-methyl-methane which comprises heating at 45° C. to 120° C. for 7 to 65 hours 100 parts of the 2-hydroxyphenyl-phenyl-methyl-methane in contact with phenol and from 0.5 to 10 parts of hydrogen fluoride.

4. A process for the isomerization of 2-hydroxy-phenyl-phenyl-methyl-methane to 4-hydroxyphenyl-phenyl-methyl-methane which comprises heating at 45° C. to 120° C. for 7 to 65 hours 100 parts of the 2-hydroxyphenyl-phenyl-methyl-methane in contact with phenol and from 0.5 to 10 parts of boron trifluoride.

5. A process for preparation of para secondary aralkyl phenols by isomerization of ortho secondary aralkyl phenols derived from phenol and an alkyl substituted styrene, which comprises heating at 45° C. to 120° C. for 7 to 65 hours 100 parts of said ortho secondary aralkyl phenol in contact with phenol and from 0.5 to 10 parts of a catalyst taken from the group consisting of aluminum chloride, hydrogen fluoride and boron trifluoride.

6. A process as in claim 5 wherein the catalyst is aluminum chloride.

7. A process as in claim 5 wherein the catalyst is hydrogen fluoride.

8. A process as in claim 5 wherein the catalyst is boron trifluoride.

RALPH I. DUNLAP, JR.

REFERENCES CITED

The following references are of record in the file of this patent:

UNITED STATES PATENTS

| Number | Name | Date |
|---|---|---|
| 2,247,402 | Perkins et al. | July 1, 1941 |
| 2,441,408 | Goldblum | May 11, 1948 |